United States Patent [19]

Dickason et al.

[11] 4,281,728
[45] Aug. 4, 1981

[54] VEHICLE PLATFORM SCALE

[75] Inventors: Allen D. Dickason, Seattle; R. Laing Hildebrant, Issaquah, both of Wash.

[73] Assignee: Lodec, Inc., Lynnwood, Wash.

[21] Appl. No.: 131,665

[22] Filed: Mar. 19, 1980

[51] Int. Cl.³ .................. G01G 19/02; G01G 3/14
[52] U.S. Cl. ..................................... 177/134; 177/211
[58] Field of Search ............................... 177/134, 211

[56] References Cited

U.S. PATENT DOCUMENTS

| 3,661,220 | 5/1972 | Harris | 177/211 X |
|---|---|---|---|
| 4,020,911 | 5/1977 | English et al. | 177/211 X |
| 4,095,659 | 6/1978 | Blench et al. | 177/211 X |
| 4,210,216 | 7/1980 | Godden | 177/134 |

Primary Examiner—George H. Miller, Jr.
Attorney, Agent, or Firm—Christensen, O'Connor, Johnson & Kindness

[57] ABSTRACT

A vehicle platform scale includes a weighbridge platform mounted on transversely positioned load cell assemblies. Each load cell assembly includes a deflectable, floating load cell and associated strain gauges mounted in a load cell tray. Each load cell rests at its opposite ends on a pair of freely mounted bearing rods retained in fixed positions with respect to one another and with respect to the load cell by cooperable grooves in the bottom surface of each end of the load cell. Weight load from the overlying weighbridge platform is transmitted to the middle portion of the load cell through a pair of load cell buttons affixed to the upper surface of the load cell. The load cell is retained in the load cell tray against upward displacement during handling or lifting of the scale by a pair of top retaining plates overlying the ends of the load cell. The load cell is retained against lateral displacement within the load cell tray by a pair of neoprene rubber bumper plates at the opposite ends of the load cell. The load cell is further retained against displacement in the load cell tray along the axis of the weighbridge platform by four pins that protrude from the side walls of the load cell tray at positions centered on the axes of deflective rotation of the opposite ends of the load cell.

10 Claims, 5 Drawing Figures

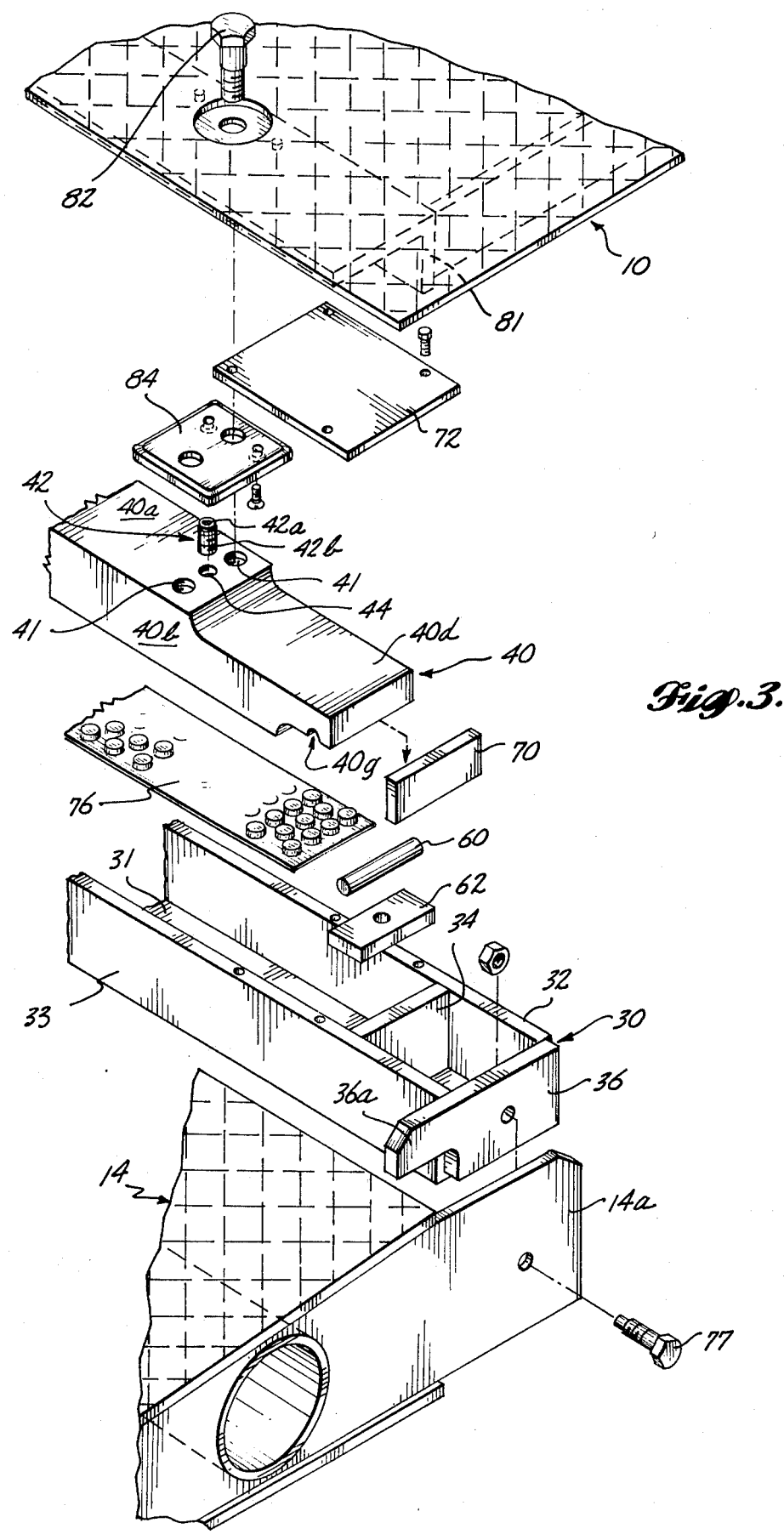

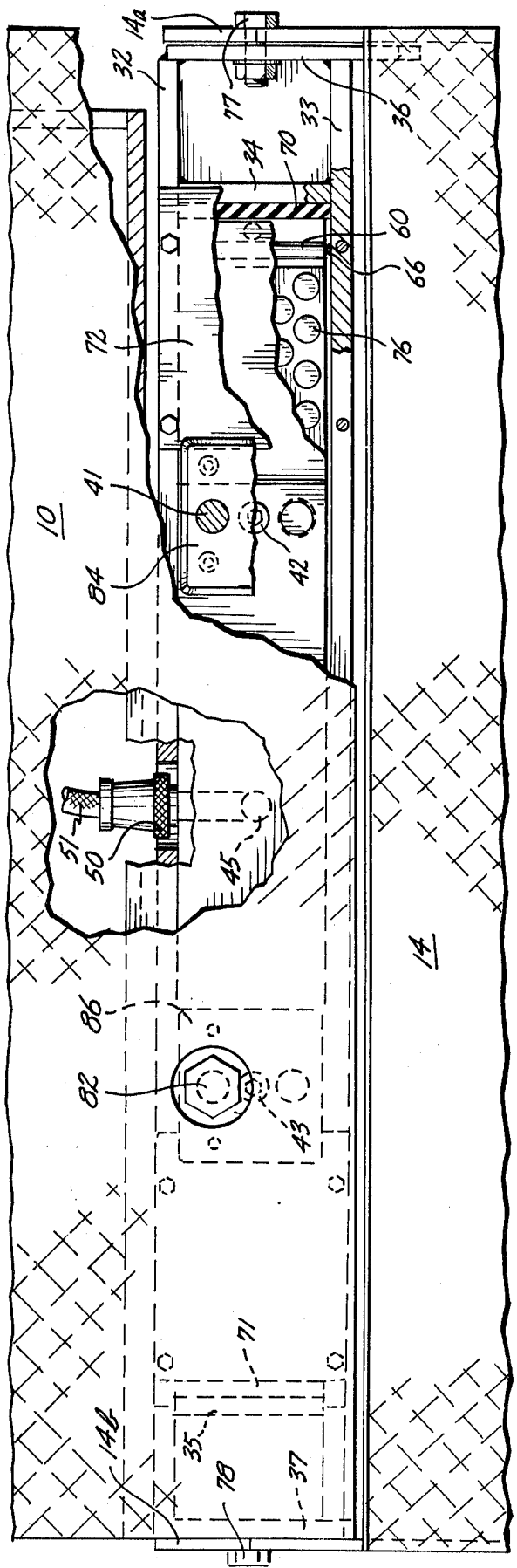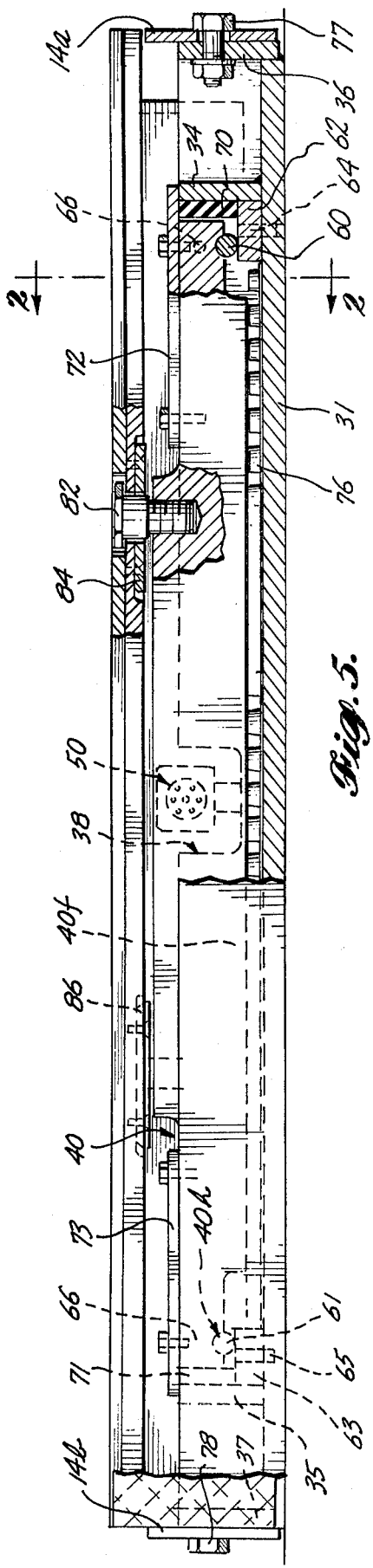

VEHICLE PLATFORM SCALE

BACKGROUND OF THE INVENTION

The present invention relates generally to platform scales, and more particularly to vehicle platform scales having strain gauge load sensors affixed to deflectable load cells.

Platform scales for measuring axle weight loads of motor vehicles are known in the prior art to include generally one or more elongate weighbridge platforms mounted on load cell assemblies. Such platform scales are generally employed in pairs positioned parallel to one another and spaced apart to accommodate the left and right-hand sets of wheels of a vehicle driven onto the scales. Each weighbridge platform is sufficiently wide to accommodate the wheel or wheels at one end of an axle. Each platform scale normally includes at least two weighbridge platforms aligned end-to-end in order to accommodate the multiple wheels of a dual tandem rear axle assembly of a conventional commercial truck. Longer platform scales having three or more weighbridge platforms are also available to accommodate triaxle trucks or special purpose vehicles.

In operation, a vehicle is driven onto a pair of parallel, spaced platform scales and stopped momentarily with a set of axles centered on the scales. The weight loads on the individual weighbridge platforms are measured and electronically combined to indicate the total weight load of the axle at a remote operator's station. The weight loads of successive sets of axles are sequentially recorded and summed after all axle assemblies have been weighed to give the gross weight of the vehicle.

The weight load on each individual weighbridge platform is typically borne entirely by two load cell assemblies that support the opposite ends of the platform. Each load cell assembly includes a deflectable load cell positioned transversely with respect to the longitudinal axis of the weighbridge platform. The load cell typically consists of a rigid steel beam supported at its opposite ends in a manner such that its midsection may deflect downwardly in response to a weight load from the weighbridge platform.

The load cell typically includes a number of strain transducers, generally referred to as strain gauges, affixed to its lower surface. Downward deflection of the load cell is manifested by tensile stresses in the lower surface of the load cell. The strain gauges respond to such stresses by producing an electrical signal that varies in magnitude with the extent of the load cell deflection. The load cell and its strain gauges are calibrated such that the assembly can be used to accurately and reproducibly measure weight loads on the load cell. In operation of the platform scale, the electrical outputs from the two load cells under the opposite ends of a weighbridge platform are combined electronically to obtain a measure of the total weight load on the platform.

Ongoing efforts have been made to improve the durability, accuracy and precision of vehicle platform scales of the type thus far described. Such efforts have been addressed both to the general object of improving the performance of load cell assemblies in all applications, as well as to the more specific object of improving the performance of vehicle platform scales intended for routine use at truck stops and truck inspection stations.

More specifically, it has been sought to develop a load cell assembly having a floating load cell, that is, a load cell assembly wherein the load cell is freely cantilevered off a pair of end supports and wherein the deflection of the load cell is not restricted by mounting or securing devices normally employed to maintain the load cell in its proper position. Ideally, a load cell should be freely cantilevered off of its underlying end supports such that its midsection may deflect freely downwardly under the effect of a weight load. The ends of the load cell should be free and unconstrained, as by fastening bolts or mounting devices securing the load cell in place. Even though the ends of the load cell move only a slight amount during deflection, it is found that fastening of the ends of the load cell to the underlying end supports or to the frame of the load cell assembly imposes stresses on the load cell during deflection which significantly affect the electrical outputs of the strain gauges. Nevertheless, it is also necessary that the position of the load cell be fixed with respect to the load cell end supports and with respect to the overlying weighbridge platform, since the electrical outputs of the strain gauges are significantly affected by the position at which the weight load is imposed on the upper surface of the load cell and also by the positions of the end supports under the load cell. Large variations in the outputs of the strain gauges result if the load cell is allowed to creep or otherwise move about on stationary end supports, or if the point or points at which the weight load is imposed on the load cell is allowed to vary. Prior art platform scale assemblies have employed fastening devices designed to bind the ends of the load cell as little as possible, but which nevertheless affect the outputs of the strain gauges to some extent.

For example, in certain platform scales developed by the applicants, a load cell was mounted on cylindrical bearing rods which rested in cylindrically curved grooves in underlying bearing plates. The bearing rods were thus retained in fixed positions by the grooves. The bottom surfaces of the load cell were flat where they bore upon the bearing rods in order that the ends of the load cell would be freely cantilevered off the bearing rods and undergo a slight rolling motion on the bearing rods during downward deflection of the load cell under a weight load. In order to keep the load cell precisely located on the bearing rods, it was necessary to bolt the ends of the load cell to the underlying bearing plates and the frame of the load cell assembly. As a result, a portion of weight loads imposed on the load cell was borne by the bolts securing the ends of the load cell in position, as opposed to the load being borne entirely by the deflectable load cell. Although the load cell assembly was capable of being calibrated to give accurate weight measurements, it was found that the calibration was difficult to maintain due to hysteresis of the securing bolts and shifting of the bolts and the load cell. Frequent recalibration of the scale and adjustment of the torque of the retaining bolts was necessary to ensure accurate operation of the scale.

Certain other performance requirements are unique to vehicle platform scales intended for routine commercial use in truck stops or for truck inspection purposes by law enforcement officers. For example, such scales must be sufficiently rugged to withstand hard braking or skidding of vehicles on the scales. Also the scales must be able to withstand vehicles occasionally being driven onto the scales improperly, for example at an angle, as well as vehicles being positioned off center on the weighbridge platforms. The scales must also operate accurately and reliably under all weather conditions, and must be protected against the effects of snow and ice accumulating under and around the weighbridge platforms and the load cell assemblies.

Portable vehicle platform scales have other types of performance requirements. Portable scales are used, for example, by law enforcement officers and regulatory agencies in the establishment of temporary vehicle inspection stations. Such scales must be easy to handle and transport and yet must maintain their calibration during handling and moving. Moreover, portable scales are typically used on a flat roadway where they cannot be embedded in a recess in the pavement to form a street-level scale in the customary manner of a permanent scale facility. Accordingly, portable scales must be constructed as low as possible to the ground and must include entry and exit ramps leading to and from the opposite ends of the platform. It is desirable to have such scales as low as possible to the ground for ease of operation and particularly to ensure accuracy in the weighing of tank trucks. Tank trucks undergo a shift in their center of gravity due to shifting of fluid when one set of axles is raised relative to the others. A rise in the height of one axle, even by a few inches, may cause a significant inaccuracy in the resulting gross weight.

Accordingly, it is a general object of the present invention to provide an improved platform scale.

More specifically, it is an object of the present invention to provide a platform scale with a load cell assembly having a floating load cell.

It is also an object to provide a load cell assembly wherein a load cell is freely cantilevered off a pair of load cell supports, yet wherein the load cell is also maintained in a fixed, predetermined position with respect to its underlying end supports and with respect to the overlying weighbridge platform.

It is another object of the present invention to attain the foregoing objects and also provide an improved low profile, portable vehicle scale that is unaffected by severe weather conditions and which is sufficiently durable to withstand routine handling and moving from one location to another.

SUMMARY OF THE INVENTION

The present invention is embodied in a vehicle platform scale wherein a weighbridge platform rests upon at least one load cell assembly. The load cell assembly includes a floating load cell mounted in an upwardly opening load cell tray. The load cell extends transversely to the longitudinal axis of the overlying weighbridge platform. The load cell includes strain gauge transducers affixed along its lower surface. The opposite ends of the load cell rest upon cylindrical bearing rods that are maintained in fixed positions with respect to the load cell by cooperable grooves in the lower surfaces of the ends of the load cell. The bearing rods rest upon flat bearing plates such that they may roll slightly with each deflection of the load cell. The load cell tray operates to retain the load cell in position without imposing stressed on it by the use of fasteners and the like. In a preferred embodiment, elastomeric bumper plates are interposed between the ends of the load cell and the end walls of the load cell tray to maintain the load cell in proper position.

In another aspect of the invention, weight load from the weighbridge platform is transmitted to the midsection of the load cell by a pair of load cell buttons spaced apart on the top surface of the load cell. The load cell buttons are secured to the upper surface of the load cell to precisely fix the points at which the weight load is transmitted to the load cell and thereby compensate for slight shifts in the position of the weighbridge platform on the load cell.

A plurality of strain gauges are attached to the lower surface of the load cell in a conventional manner. In another aspect of the invention, the strain gauges are insulated from temperature variations and the effects of accumulated snow, ice and water by a plastic bubble pack installed to fill the space between the lower surface of the load cell and the underlying floor of the load cell tray. The bubble pack is sufficiently resilient to keep ice and water from accumulating under the load cell without impairing the normal deflection of the load cell.

BRIEF DESCRIPTION OF THE DRAWINGS

FIG. 3 is an exploded pictorial view of one end of a load cell assembly and the overlying weighbridge platform of the platform scale of FIG. 1.

FIG. 4 is a plan view of a load cell assembly of FIG. 3.

FIG. 5 is an end view in partial cross section of the load cell assembly of FIG. 3.

DESCRIPTION OF THE PREFERRED EMBODIMENT

Figure 1:
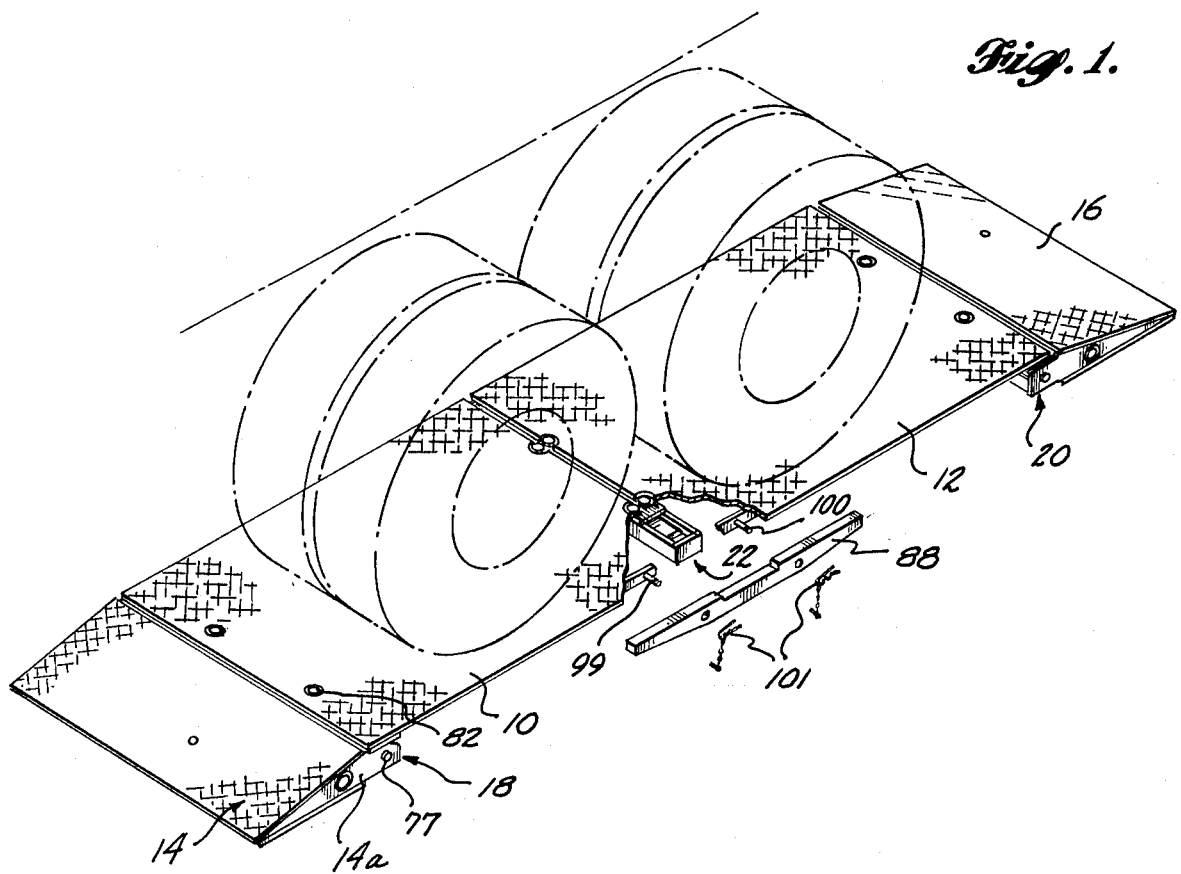
FIG. 1 is a pictorial view of the preferred embodiment of a vehicle platform scale constructed in accordance with the present invention.
Figure 2:
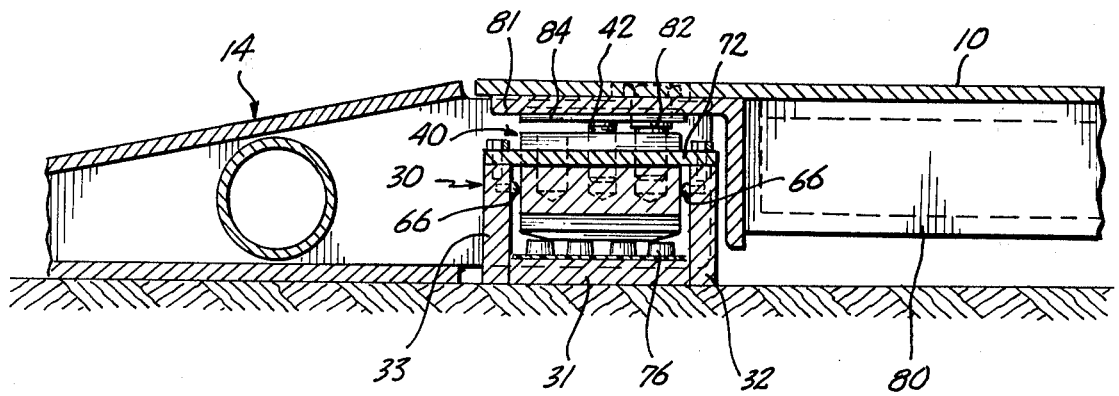
FIG. 2 is a cross-sectional side view taken along line 2–2 of FIG. 5 of a load cell assembly and the end of a weighbridge platform.

FIG. 1 illustrates the preferred embodiment of a low-profile, portable vehicle platform scale constructed in accordance with the present invention. The scale is capable of measuring axle loads of either single or dual axle vehicles. The platform scale includes generally a pair of weighbridge platforms 10 and 12 aligned end-to-end. Each platform 10 and 12 is sized to accommodate a pair of wheels (shown in phantom outline in FIG. 1) of a conventional dual axle truck trailer. A pair of approach ramps 14 and 16 are connected to the opposite ends of the platforms 10 and 12.

The platform scale includes a total of three load cell assemblies. Two end load cell assemblies 18 and 20 are positioned under the opposite ends of the platforms 10 and 12, adjacent the approach ramps 14 and 16 respectively. A middle load cell assembly 22 is positioned under the adjacent ends of the platforms 10 and 12. The three load cell assemblies 18, 20, and 22 are substantially identical in function, and differ in structure only in details regarding their connections to the weighbridge platforms and the ramps 14 and 16. Accordingly, the essential function and structure of each of the three load cell assemblies 18, 20, and 22 may be adequately understood by the following description of the end load cell assembly 18.

Referring to FIGS. 2 through 5, the end load cell assembly 18 includes an upwardly opening load cell tray 30 that contains and supports a deflectable load cell 40. The load cell tray 30 is generally rectangular and is constructed of one-half inch thick steel plate. The load cell tray 30 includes a floor plate 31, upright sidewalls 32 and 33, interior end walls 34 and 35, and exterior end walls 36 and 37. The sidewall 32 includes a U-shaped opening 38 centered on its upper edge.

The load cell 40 is formed from a solid, elongate block of steel machined to the desired shape and dimensions. More specifically, the load cell 40 includes a planar top surface 40a, parallel side surfaces 40b and 40c, and a bottom surface (not shown). The load cell 40 further includes end portions 40d and 40e that are each of relatively smaller vertical thickness than that of the main central body of the load cell. Four threaded holes 41 open upwardly from the top surface 40a, two each at the opposite ends of the top surface 40a, for securing the end of the weighbridge platform 10 to the load cell 40 in a manner described in more detail below.

Two load cell buttoms 42 and 43 are affixed to the top surface 40a of the load cell 40 at points centered between the pairs of threaded holes 41 at the opposite ends of the top surface 40a. Referring to FIG. 3, the load cell button 42 includes a flat head portion 42a and a threaded shank 42b. The shank 42b is engaged in a threaded hole 44 in the top surface 40a of the load cell 40. The load cell button 43 is identical to the button 42 and is likewise engaged in a threaded hole in the load cell 40. The load cell buttons 42 and 43 bear the weight load of the ends of the platforms 10 and 12 as more fully described below. The purpose of the load cell buttons 42 and 43 is to cause the weight load from the platform 10 to be transmitted to fixed points on the load cell 40 which are precisely reproducible and which do not vary laterally over long periods of time.

The bottom surface of the load cell 40 includes an elongate recess 40f in which are affixed to the load cell a plurality of strain transducers (not shown). Electrical leads from the strain transducers run inwardly along the recess and upwardly through a central hole 45 in the bottom of the load cell 40 and are channelled through a connector assembly 50 which protrudes through the U-shaped opening 38 in the side wall 32 of the load cell tray 30. The electrical leads run from the connector assembly 50 through a cable 51 to a remote operator's station (not shown).

The load cell 40 further includes a pair of semicylindrical grooves 40g and 40h in the lower surfaces of the end portions 40d and 40e, respectively. The load cell 40 rests upon a pair of cylindrical bearing rods 60 and 61 that are conformably engaged in the grooves 40g and 40h. The bearing rods 60 and 61 rest upon flat bearing plates 62 and 63 which are positioned on the floor plate 31 of the load cell tray 30 adjacent the interior end walls 34 and 35, respectively. The bearing plates 62 and 63 are retained in place by pins 64 and 65 which extend upwardly from the floor plate 31 into cooperable holes in the bearing plates 62 and 63.

In the operation of the load cell assembly, weight loads on the load cell buttons 42 and 43 cause the midsection of the load cell 40 to deflect downwardly. The end portions 40d and 40e, being freely cantilevered off the bearing rods 60 and 61, undergo unconstrained deflective rotation about the axes of the bearing rods 60 and 61. The bearing rods 60 and 61 are free to roll slightly on the planar bearing plates 62 and 63 upon deflection of the load cell 40, with the result that the weight load on the load cell 40 is translated essentially entirely into bending stresses in the load cell 40.

A pair of rectangular neoprene rubber bumber plates 70 and 71 are positioned snugly between the ends of the load cell 40 and the interior end walls 34 and 35, respectively, of the load cell tray 30. The rubber bumper plates 70 and 71 operate to prevent longitudinal displacement of the load cell 40 within the load cell tray 30 without significantly constraining the ends of the load cell 40 during deflection.

The load cell 40 is constrained against lateral displacement within the load cell tray 30 by a set of four pins 66 that protrude inwardly from the side walls 32 and 33 just above the bearing rods 60 and 61. The pins 66 are thus positioned just above the axes of deflective rotation of the load cell 40 so as to minimize interference with the deflection of the load cell 40 should the pins 66 be in contact with the load cell 40.

A pair of top retaining plates 72 and 73 are bolted to the upper edges of sidewalls 32 and 33 of the load cell tray 30 above the end portions 40d and 40e of the load cell 40. The retaining plates 72 and 73 prevent the load cell from being lifted out of the tray 30 when upward force is applied to the platform 10, as for example during lifting of the platform scale during handling or transporting. The entire platform scale may thus be conveniently lifted by the platforms 10 and 12 and moved to another location without affecting the relative positioning of the platforms on the load cell assemblies.

A plastic bubble pack 76 is positioned between the bottom surface of the load cell 40 and the floor plate 31 of the load cell tray 30 to prevent ice, snow and debris from accumulating under the load cell 40. The bubble pack 76 consists of a plastic film having numerous enclosed air bubbles, such as that occasionally used as a packing material for fragile objects. Grease is liberally applied over and around the bubble pack 76 to further seal the bottom surface of the load cell 40 from the elements. It is found that the combination of the plastic bubble pack 76 and the grease provides a resilient, waterproof seal to the underside of the load cell assembly that accommodates deflection of the load cell 40 without effecting its precision or accuracy.

The exterior end walls 36 and 37 of the load cell tray provide attachement points for the entry ramp 14. The ramp 14 includes sidewalls 14a and 14b that extend toward the load cell assembly 18 from the ramp 14 and overlap the exterior end walls 36 and 37 of the tray 30. Bolts 77 and 78 pass through aligned holes in the sidewalls 14a and 14b and the end walls 36 and 37, respectively. The bolts pivotably attach the ramp 14 to the load cell tray 30 to thereby permit the ramp 14 to pivot slightly to accommodate slight irregularities in the pavement surface without imposing stresses on the load cell tray 30. The end walls 36 and 37 include extension portions 36a and 37a that extend toward the ramp 14 and operate to keep the ramp 14 extended substantially horizontally when the entire scale is lifted during transport.

The weighbridge platforms 10 and 12 each consist of aluminum alloy plates having a plurality of reinforcing ribs 80 affixed to their lower surfaces. An angle bar 81 is attached to the lower side of the end edge of the platform 10. The end edge of the platform 10 is loosely secured to the load cell 40 by weighbridge bolts 82. The bolts 82 pass through aligned holes in the edge of the platform 10 and its angle bar 81 and also pass through a pair of top bearing plates 84 and 86. The top bearing plates 84 and 86 are secured in cooperable recesses milled in the lower side of the angle bar 81. The top bearing plates 84 and 86 are constructed of a hard steel, the purpose of which is to provide hard, nondeformable surfaces to bear upon the load cell buttons 42 and 43.

The two weighbridge platforms 10 and 12 are each attached in a similar manner along their adjacent end edges to the middle load cell assembly 22. The middle load cell assembly 22 differs from the end load cell assemblies 18 and 20 only in that it is somewhat shorter because it does not include the exterior end walls 36 and 37. In all other respects, the load cell assembly 22 and the means of attachment of the platforms 10 and 12 to the load cell are essentially the same as that described above with respect to the end load cell assembly 18.

The weighbridge platforms 10 and 12 are further connected to one another by a first restraining bar 88 and a second restraining bar (not shown) on the opposite sides of the platform scale. The restraining bar 88 is connected to the weighbridge platforms 10 and 12 by shafts 99 and 100 that extend laterally from underneath the weighbridge platforms 10 and 12 and pass through aligned holes in the restraining bar 88. Cotter pins 101 secure the restraining bar 88 on the shafts 99 and 100. The purpose of the restraining bar 88 is to allow the entire platform scale assembly to be lifted and transported as a unit, with the platforms 10 and 12 maintained in parallel alignment to prevent damage to the load cell assembly 22.

In operation, a vehicle is driven onto a pair of the platform scales shown in FIG. 1. When the rear axle assembly of the truck is finally positioned, there will typically be two wheels bearing upon each of the platforms 10 and 12, as shown in phantom outline in FIG. 1. The weight load outputs of the three load cell assemblies 18, 20 and 22 are electronically combined with one another and with the output from the second platform scale (not shown) to indicate the total weight load of the dual rear axle assembly. When all of the axles of the truck have been weighed in this manner, the total gross weight of the truck is obtained by summing the individual weight loads.

The platform scale may be readily transported and quickly set up for operation without requiring recalibration. The scale may be partly disassembled during transport or may be moved over short distances fully assembled, as for example with a forklift engaged under the platforms 10 and 12. The load cells are at all times contained in their load cell trays and are thereby protected against damage or misalignment.

Although the present invention is described and illustrated herein by reference to a preferred embodiment, it should be understood that various substitutions, modifications and alterations that may be apparent to one skilled in the art may be made without departing from the essential spirit of the invention. For example, in another embodiment of the present invention three platforms, each generally similar to the platforms 10 and 12, are linked together to provide a capacity for triple axle trucks. Accordingly, the scope of the present invention is defined by the following claims.

The embodiments of the invention in which an exclusive property or privilege is claimed are defined as follows:

1. A platform scale comprising a platform mounted on a load cell assembly, said load cell assembly including a deflectable load cell, a load cell tray and a pair of bearing rods, said load cell tray including substantially planar, spaced apart bearing rod support means, said load cell including a pair of transverse grooves spaced apart such that said load cell may be mounted in said load cell tray with said bearing rods engaged in said transverse grooves and bearing upon said planar support means for free rotational deflective motion upon downward deflection of said load cell between said bearing rods, said platform being mounted on said load cell assembly such that downward weight loads on said platform are transmitted to said load cell at points intermediate between said transverse grooves, said load cell further including strain transducer means affixed thereto for measuring downward deflection of said load cell upon a weight load being applied to said platform.

2. The platform scale defined in claim 1 wherein said bearing rods are substantially cylindrical and wherein said transverse grooves of said load cell are semicylindrical in configuration and sized to conform with said bearing rods.

3. The platform scale defined in claim 2 wherein said load cell tray includes a floor plate, upright sidewalls and upright endwalls, and wherein said substantially planar bearing rod support means comprise a pair of flat bearing plates mounted on said floor plate of said load cell tray adjacent said end walls of said load cell tray, said load cell including end surfaces, said load cell assembly further including a pair of resilient bumper plates snugly interposed between the end surfaces of said load cell and the respectively adjacent end walls of said load cell tray to thereby retain said load cell against lengthwise displacement within said load cell tray.

4. The platform scale defined in claim 3 wherein said load cell includes a top surface and a bottom surface, said strain transducer means being affixed to said bottom surface of said load cell, said load cell assembly further including resilient means interposed between said bottom surface of said load cell and said floor plate of said load cell tray to prevent accumulation of foreign material under said load cell.

5. The platform scale defined in claim 4 wherein said resilient means comprises a plastic bubble pad.

6. The platform scale defined in claim 5 wherein said load cell assembly further includes a pair of load cell buttons affixed to said top surface of said load cell, said load cell buttons being spaced apart longitudinally along said top surface of said load cell, said platform being mounted on said load cell buttons.

7. The platform scale defined in claim 6 wherein said load cell includes end portions having vertical thicknesses relatively smaller than the vertical thickness between said top surface and said bottom surface of said load cell, said end portions of said load cell each having an upper surface and a lower surface, said transverse grooves of said load cell being formed in said lower surfaces of said end portions adjacent the ends of said load cell.

8. The platform scale defined in claim 7 wherein said load cell assembly further includes a pair of top retaining plates affixed at opposite ends of said load cell tray to the upper edges of said sidewalls of said load cell tray to thereby overlie said upper surfaces of said end portions of said load cell, said walls of said load cell tray being of a height such that a portion of said load cell including said top surface of said load cell projects above said load cell walls and above said top retaining plates, said top retaining plates operating to retain said load cell in said load cell tray against upwardly directed forces exerted on said load cell during handling or lifting of the platform scale.

9. The platform scale defined in claim 8 wherein said top surface of said load cell is generally rectangular in configuration, said load cell buttons being centered at the opposite ends of said top surface of said load cell, each load cell button including a threaded shank portion engaged in a cooperably threaded hole in said top surface of said load cell, each load cell button further including a head portion having a planar upper surface.

10. The platform scale defined in claim 9 wherein said platform is generally rectangular in configuration and includes opposite end edges, said platform being mounted on a pair of said load cell assemblies positioned transversely under the opposite end edges of said platform, said platform including steel top bearing plates interposed between said load cell buttons and the respective end edges of said platform, said platform being connected to said load cells by bolts passing through holes in said platform adjacent said end edges of said platform, said bolts being engaged in cooperably threaded holes in said top surfaces of said load cells, said bolts having heads slightly spaced from the upper surface of said platform to thereby loosely retain the platform in position on the load cell assemblies without imposing binding stresses on the load cells.

* * * * *